H. WALKER.
Odometer.
No. 23,329.
Patented March 22, 1859.
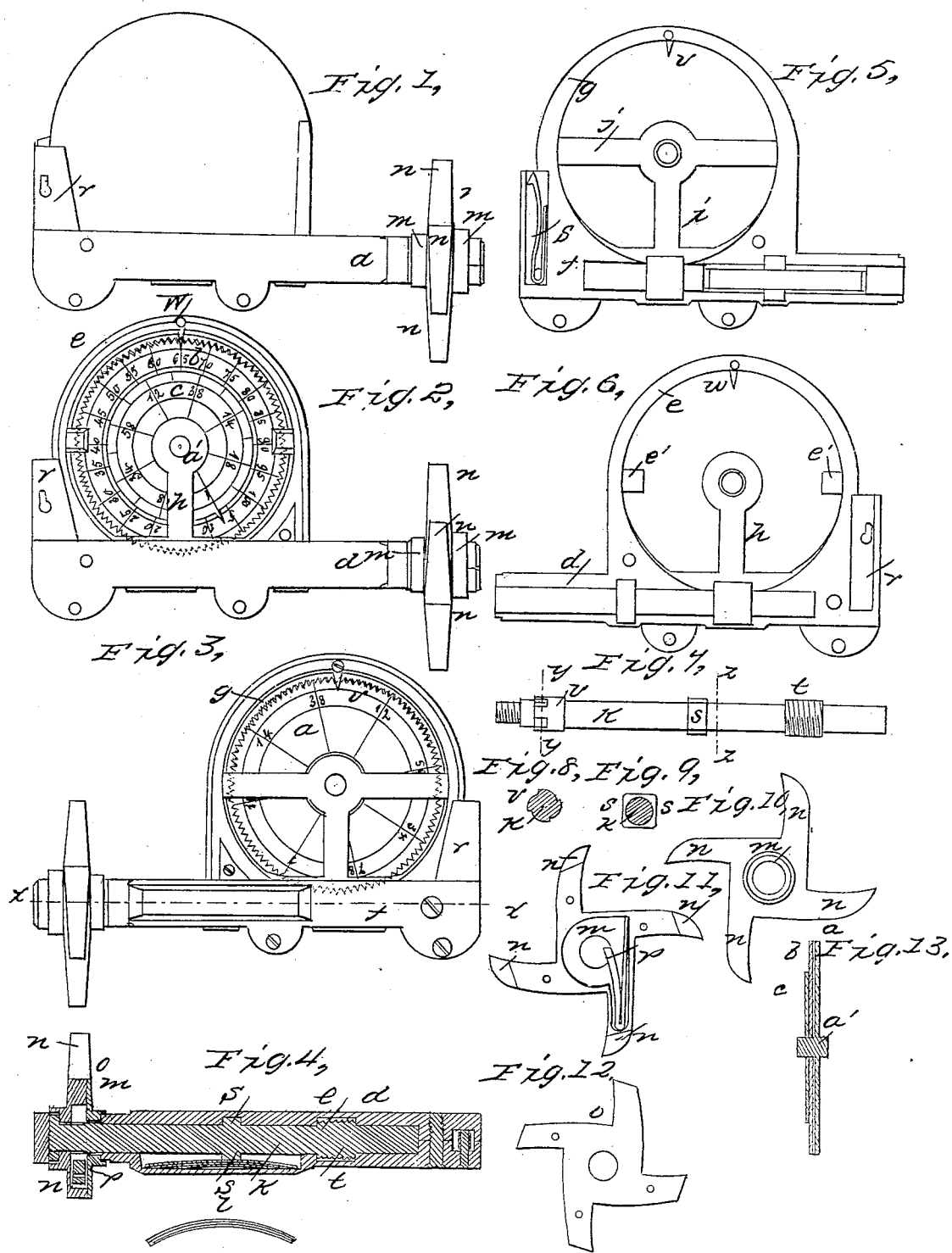

UNITED STATES PATENT OFFICE.

HASKEL WALKER, OF HARTFORD, VERMONT, ASSIGNOR TO HIMSELF AND BENJAMIN P. DRIGGS.

ODOMETER.

Specification of Letters Patent No. 23,329, dated March 22, 1859.

*To all whom it may concern:*

Be it known that I, HASKEL WALKER, of Hartford, in the county of Windsor and State of Vermont, have invented a new and Improved Odometer; and I do hereby declare that the following is a full and exact description thereof, reference being had to the accompanying drawings, making a part of this specification.

Figure 1, of the said drawings is a side view of my improved odometer; Figs. 2, and 3, views of opposite sides of the same, after its protecting casing has been removed; Fig. 4, a section in the line $x$, $x$, of Fig. 3; and the remaining drawings are representations in detail of the individual parts of the said invention,—Figs. 8, and 9, being sections in the lines $y$, $y$, and $z$, $z$, of Fig. 7.

The short shaft $a'$, of my improved odometer carries the two toothed wheels $a$, $b$, and the index disk $c$; the former and the latter being secured to the said shaft in such a manner that they are compelled to rotate with it, and the wheel $b$, which is loosely embraced between the toothed-wheel $a$, and the disk $c$, being allowed to rotate freely on the said shaft. The wheel $b$, has one hundred pointed teeth radiating from its periphery, and the wheel $a$, has but ninety-nine teeth, and yet the teeth of the two wheels so nearly correspond with each other in size and shape that they play smoothly between the threads of the screw $t$, on the actuating shaft $k$. Hence it will follow that the periphery of the wheel $a$, (which has but 99 teeth) will advance the amount of the width of one of its own teeth upon the periphery of the wheel $b$, at each revolution; or in other words, the number of revolutions of the shaft $k$, which will impart one hundred revolutions to the wheel $a$, will only impart ninety-nine revolutions to the wheel $b$.

The aforesaid moving parts of my improved odometer, are supported in working positions between the matching sides $d$, $e$, $e'$ and $f$, $g$, $i$, $j$, of a suitable metallic frame, whose peculiar shape is clearly represented by the accompanying drawings, and which is of such a shape that the said supporting frame allows the figured portions of the said wheels to be distinctly visible, when the protecting cover is removed from said frame. The said protecting cover—(shown in Fig. 1,) may be secured in its place by means of any suitable lock located within the box $r$, and acting upon a hook, or staple, combined with the said cover and passing into an aperture in said box. A hub $m$, is combined with the projecting end of the shaft $k$, which hub has four radial arms $n$, $n$, projecting at equal distances from each other.

My improved odometer is intended to be secured to the main axle of a vehicle and in such a position that the aforesaid hub $m$, will project over the inner end of the hub of one of the wheels on said axle, so that a tooth of any suitable shape projecting from the inner end of the said wheel-hub, will, at each revolution of the wheel, strike one of the arms of the hub $m$, and thereby impart the fourth part of a revolution to the shaft $k$, of the odometer.

The diameter of the screw $t$, of the shaft $k$, and the pitch of the threads of said screw must bear such a relation to the size of the carriage wheels with which the odometer is combined, that the number of turns of said wheels which will impart one revolution to the toothed wheel $a$, and the index disk $c$, will carry the vehicle forward the distance of one mile.

The shaft $k$, must be prevented from making more than the fourth part of a revolution when one of the arms of the hub $m$, is suddenly struck; and this is accomplished by means of the four straight sided faces $s$, $s$, on the said shaft, and the elliptic spring $l$, which is located in a cavity in the inner surface of the side $f$, of the odometer frame and acts against the said faces of the shaft $k$, as shown in Fig. 4.

By means of a spring pawl $p$, which is located within a cavity in the hub $m$, and in one of the arms of the same, and a series of ratchet teeth $v$, on the portion of the shaft $k$, which is embraced by the hub $m$, the said hub and shaft are combined with each other in such a manner that the hub will unerringly carry the shaft with it when the said hub is rotated in a forward direction, and when it is rotated in a reverse direction, the said hub will as unerringly turn freely upon the shaft $k$. This arrangement allows the vehicle with which my odometer is combined to be backed without producing any effect upon the shaft $k$, of the instrument, or in any way disturbing the proper position of its movements.

The hub $m$, should be secured to the shaft $k$, in such a manner that it can not be removed by any evil disposed person without destroying or greatly injuring the instrument.

The index disk $c$, is enough smaller than the wheel $b$, to leave an annular space near the periphery of said wheel for the scale of figures which indicate the number of its teeth, as shown in Fig. 2. The face of the disk $c$, has a scale formed upon it which divides it into eight equal parts, and a corresponding scale is also formed upon the rear side of the wheel $a$; which scales are figured as follows, viz, $\frac{1}{8}, \frac{1}{4}, \frac{3}{8}, \frac{1}{2}, \frac{5}{8}, \frac{3}{4}, \frac{7}{8}, 1$. The figure 1, on the disk $c$, being on the radial line which terminates at the point of the index projection on the periphery of said disk. So that while the said index projection (on the periphery of the disk $c$,) indicates upon the scale on the face of the wheel $b$, the number of miles which have been passed over from the starting point, the indexes $w$, $v$, which descend from the inner peripheries of the ring-portions $e$, $g$, of the sides of the metallic frame of the odometer, indicate, upon the scales figured on the disk $c$, and the wheel $a$, the fractional portions of a mile passed over while the said index (on the periphery of the disk $c$,) is moving from one tooth to another of the wheel $b$.

Having thus fully described my improved odometer, what I claim therein as new and desire to secure by Letters Patent is—

The peculiar arrangement of the parts thereof by which an actuating tooth upon the hub of one of the wheels of a carriage will cause each revolution of said wheel to unerringly impart a small portion of a revolution to the shaft $k$, of the odometer, while the spring $l$, by its action against the faces of the angular portion of said shaft will accurately govern and control the movements thereof substantially as herein set forth.

The above specification of my improved odometer signed and witnessed this thirtieth day of October 1858.

HASKEL WALKER.

Witnesses:
A. H. CRAGIN,
R. W. CRAGIN.